Figure 1:
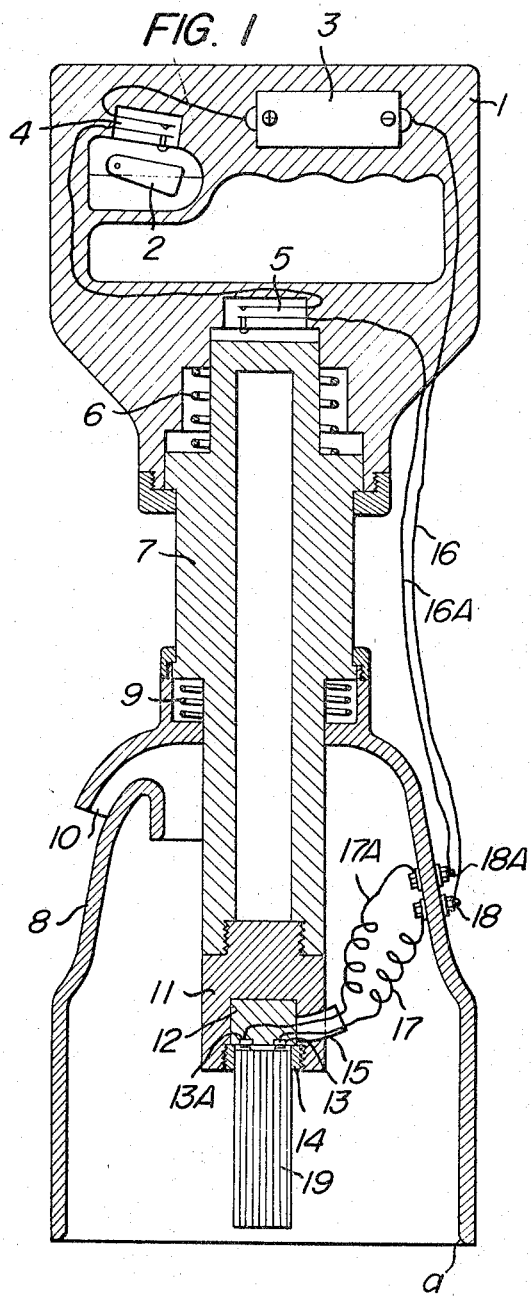

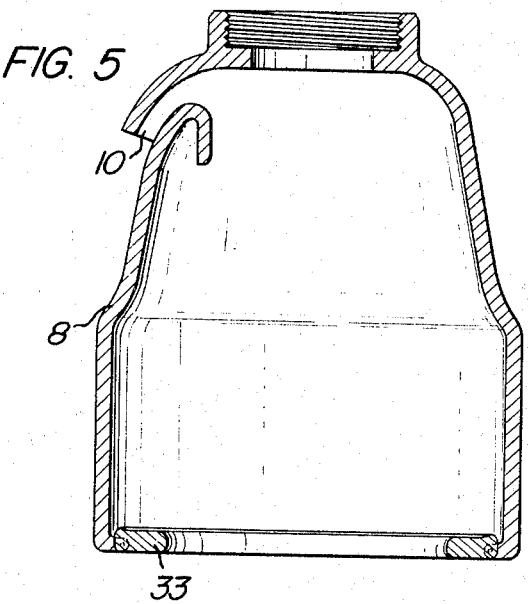
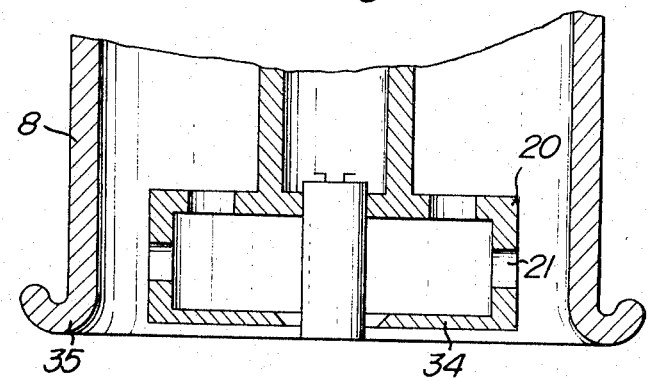

United States Patent Office 3,325,075
Patented June 13, 1967

3,325,075
TOOL FOR EXPLOSIVE SPOT WELDING
Ryuichiro Higuchi, Toshio Uesako, and Toru Niwatsukino, Nobeoka-shi, Japan, assignors to Asahi Kasei Kogyo Kabushiki Kaisha, Osaka, Japan, a corporation of Japan
Filed Dec. 28, 1964, Ser. No. 421,309
Claims priority, application Japan, Dec. 28, 1963, 38/70,524; Mar. 12, 1964, 39/13,525; Apr. 21, 1964, 39/22,179
17 Claims. (Cl. 228—3)

The present invention relates to a small size, light weight tool to be used in explosive spot welding for welding metal plates at spots utilizing the explosion energy of an explosive.

The explosive spot welding method is a method for welding two sheets of metal plates at spots which comprise placing a container of explosive prepared by filling an explosive in a container made of a synthetic resin or paper on one side of two sheets of said metal plates to be welded together and exploding said explosive. When compared with conventional fusion welding methods, such as gas welding, arc welding and electric resistance welding, which have been widely employed heretofore, the explosive spot welding method is characterized by the fact that heat does not act upon the metals to be welded, therefore rendering no change in the structure and hardness of the metal. A further attribute of the explosive welding method is that not only can metals of the same kind be welded but also different metals can be welded, which was difficult or impossible by conventional welding methods. The explosive spot welding method is particularly useful in the production of clad plates, in which a corrosion resistant metal plate, such as stainless steel, copper, aluminum, titanium nickel, tantalum and zirconium, is attached to a mild steel plate, or forms a lining therein. The explosive spot welding method is also advantageous over the aforementioned conventional methods in that, welding work can be performed conveniently at any desired location, as there is no welding apparatus nor a power source required. Furthermore, in the explosive spot welding method, since the quantity of explosive necessary is only small, the sound of the resulting explosion is small and thus it can be used in plants adjacent to an urban area. In practicing the method, it is known to use a container made of a synthetic resin or paper, which is filled with such an explosive as pentaerythritol tetranitrate (PETN), hexogen or tetryl, which causes the fragments of the container to scatter over the surrounding area, and for this reason, the workman is required to trigger the explosion of the explosive from a shelter remote from the spot of known explosion. Moreover, in the explosive spot welding method, the welding may not be achieved satisfactorily where there is a space of 2 mm. or more between two metal plates to be welded, and even if welding is achieved with such a spacing, the welded spots only may be extremely concaved and wrinkles may occur in the non-welded area. In carrying out explosive spot welding, therefore, it has been required that the two metal plates to be welded must be secured beforehand using many jigs so that there will be no such large space existing therebetween. For this purpose, much labor is required and this is particularly the case when welding metal plates having curved surfaces. Because of the foregoing drawbacks, wide application of the explosive spot welding industrially has been prevented.

An object of the present invention therefore is to obviate the aforementioned drawbacks and to provide a portable and handy tool, by means of which an explosive spot welding can be performed safely, efficiently and yet positively.

Another object of the invention is to provide a truly effective protecting means to be used in the above-said tool.

More particularly, by employing the tool according to the present invention, it is possible for the workman performing the explosive spot welding to attain positive welding while pressing the metal plates to be welded by the tool, without need for taking protection by evacuating the spot, by using the protecting means according to the present invention.

The tool of the present invention comprises a handle, a cylindrical body having a screw at the lower portion thereof providing for mounting by screwing electrodes, a holder and a protector slidably mounted on said cylindrical body with a spring interposed therebetween and an electric circuit for firing explosive in a container.

Figure 2:
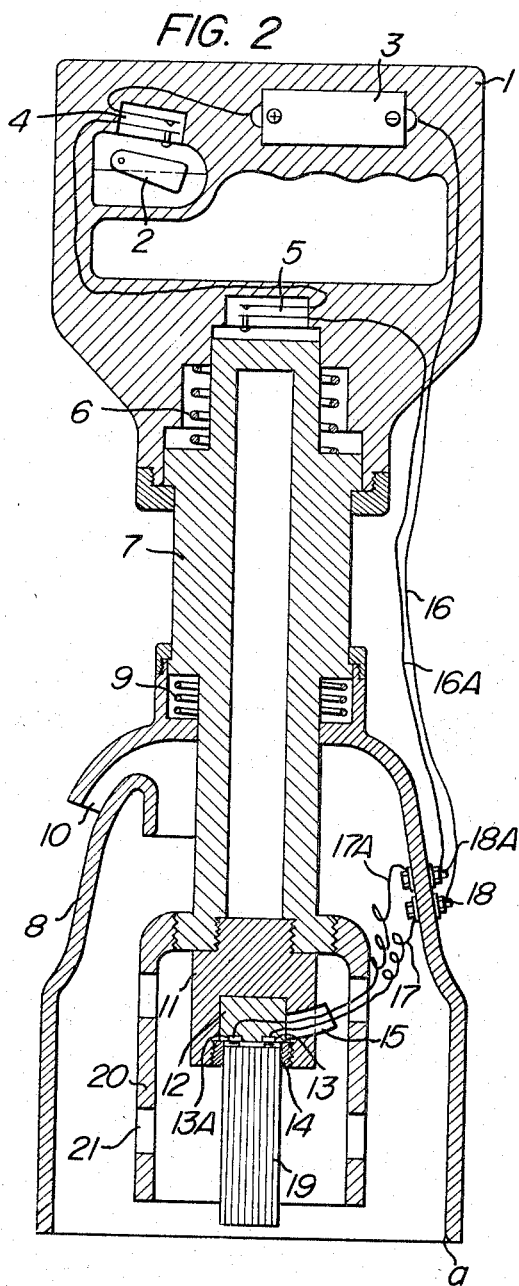
Figure 3:
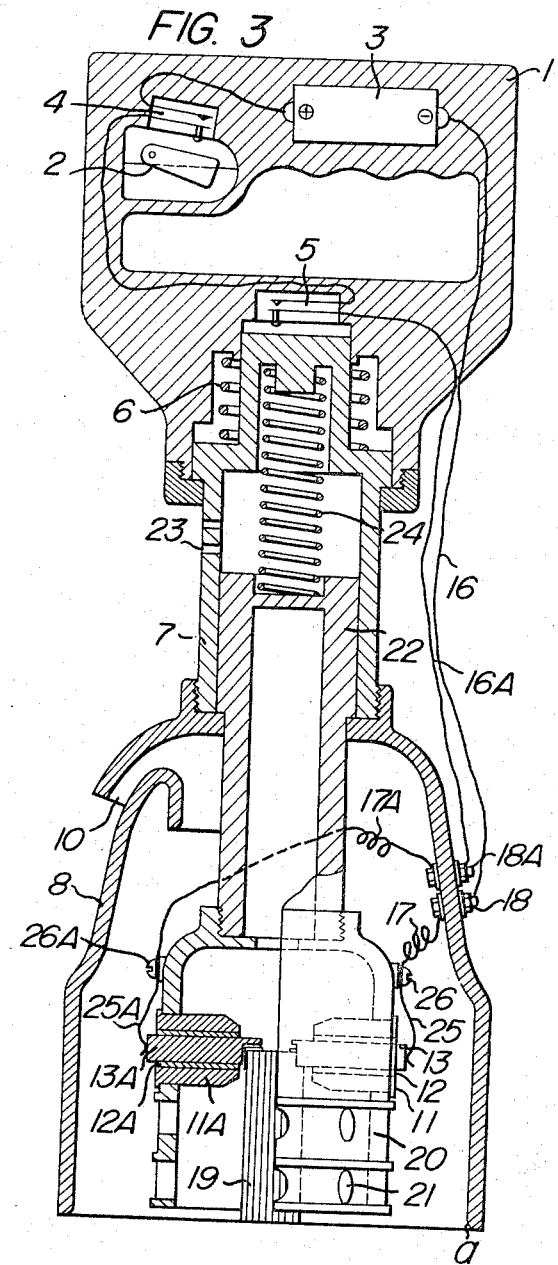

The present invention will be explained in further detail hereinafter with reference to the drawings wherein:

FIGS. 1–4 respectively are cross-sectional views illustrating different embodiments of tools according to the present invention adapted for use in explosive spot welding, and FIGS. 5 and 6 respectively illustrate in cross-section a different type of protector and inner protector than that illustrated in FIG. 3.

In FIG. 1 and FIG. 2, the numeral 1 is a handle having an electrical firing circuit, which consists of a power source, such as, battery 3 connected to a safety switch 5 and microswitch 4, disposed in the interior thereof, and provided with a trigger 2 for operating the microswitch 4 of said firing circuit. The numeral 7 is a cylindrical body having at its lower end a holder 11 for an explosive container 19, said body 7 being slidably fitted in said handle 1 with a compressive spring 6 interposed therebetween. The spring 6 has a spring force stronger than the reaction from the explosion of a container of explosive 19. The safety switch 5 therefore will not be actuated unless the handle 1 is pressed against an article being subjected to welding with a force greater than the spring force of the compressive spring 6 and accordingly there is no danger of explosion of the column of explosive 19, even when the trigger 2 is pulled closing the microswitch 4. Thereby the explosive can only be ignited in a safe condition in which the handle is pressed against the article to be welded with a prescribed force. The numeral 8 is a protector mounted on the cylindrical body 7 with a compressive spring 9 interposed therebetween, which is provided with a plurality of downwardly directed gas release holes 10 around the periphery of the upper portion. The holder 11 is secured to the lower end of cylindrical body 7 by means of threaded engagement, and has an insulator 12 fixed at its lower end by means of an anchor screw 14, to which electrodes 13 and 13A are secured. The numeral 15 is a conduit for electric conductors 17 and 17A which are respectively connected to conductors 16 and 16A through terminals 18 and 18A fixed to the protector 8, and further connected to the aforementioned electric firing circuit disposed in said handle 1. The numeral 19 is an explosive container which is used in explosive spot welding, and which is fired electrically and has the same firing circuit as that of the generally known electric blasting cap.

The tool of the present invention is operative as follows:

Namely, when the column of explosive 19 is mounted to the holder 11 within the protector 8 and exploded, the shock wave of the explosion will be directly applied against the protector 8. When the lower edge on the inner side of the protector 8 is in contact with a metal plate, cracks occur on the surface of the metal plate opposite the contact portion. Further, when the metal plates to be welded together are thin plates measuring 0.5 mm. or less in thickness, the metal plate rises in the area between the spot where they are welded and the portion where it is pressed by the protector 8, thus producing undesirable wrinkles, concurrently with the occurrence of said cracks. These wrinkles are substantially not formed when the thickness of the metal plate is greater than 0.5 mm. and do not occur at all when the thickness is greater than 1 mm. This is attributed to the fact that a thin metal plate having small mechanical strength cannot withstand the explosive action of the column of explosive, rendering large elongation, while in the case of a metal plate having a large mechanical strength, elongation does not occur. That is to say that the elongation becomes less with increased thickness. Occurrence of cracks presumably results from the fact that the metal plates are subjected to a tension, upon explosion of the explosive, toward the inner and outer sides of the protector with respect to the portion where the metal plate is pressed by the inner lower edge of the protector in an edged condition.

The occurrence of cracks can be prevented either by separating the protector 8 from the explosive 19 to such a degree that it will not be subjected to the action of a shock wave or by providing a space between the protector 8 and the metal plate so that they will not contact with each other. However, in the former case, the protector must be separated from the column of explosive 19 by as much as 30 cm, which will make the size of tool large and reduce the portability of the tool, while, in the latter case, the workman will be placed in a dangerous position and it is therefore not practical.

In view of the above, the tool of the present invention has the inner lower edge a of the protector 8 so constructed as to form a curved line of a suitable curvature to prevent occurrence of said cracks and in the inside of the protector 8 is provided with an inner protector for the purpose of preventing occurrence of the wrinkles. In FIG. 2, numeral 20 is the inner protector having a plurality of gas release holes 21 disposed on the peripheral wall. The protector 20 is secured at the lower portion of the cylindrical body 7 by being threadably engaged therewith. When the inner protector 20 is constructed so that it will not come into contact with the metal plate to be welded, it is seen that a portion of explosion gas from the explosive 19 passes through the space between the lower edge of the inner protector 20 and the metal plate, exerting a pressure on the metal plate, and thus the occurrence of wrinkles, between the spot where the plates are welded and the protector 8, is prevented. In welding metal plates from 0.1 to 0.3 mm. in thickness, occurrence of the wrinkles can be prevented by the use of an inner protector 20 as shown in FIG. 6. Since metal plate having a thickness of from 0.1 to 0.3 mm. wrinkles very easily, said inner protector 20 has a disc 34 at its lower portion, in order to minimize the action of explosion gas on the metal plate, whereby a large proportion of the explosion gas from the column of explosive 19 is released outside through the gas release holes 21 provided on the peripheral wall thereof, and thus the occurrence of wrinkles is prevented.

As has been explained above, in the tool shown in FIG. 1, a protecting means is constituted only by a protector 8, while the protecting means in the tool shown in FIG. 2 is constituted with an outer protector 8 and an inner protector 20.

FIG. 3 illustrates a cross-sectional view of the structure of another embodiment of the tool for explosive spot welding, according to the present invention.

In FIG. 3, the numeral 1 is a handle having an electric firing circuit for firing a container of explosive, enclosed therein, said electric firing circuit comprising a power source battery 3, a microswitch 4 and safety switch 5, and provided with a trigger 2 to energize said firing circuit. The numeral 7 is a cylindrical body having a plurality of air release holes 23 provided on the peripheral wall of its upper portion, and in the inside thereof, there is a shock absorbing spring 24 which keeps a piston 22 biased downwardly, said cylindrical body being slidably mounted in said handle 1 with a coil spring 6 interposed therebetween. Coil spring 6 has a spring force stronger than the reaction produced by the explosion of a column of explosive at the time of welding. This tool is so constructed that, in welding, the upper end of the cylindrical body 7 will not come in contact with a press button in the safety switch 5, unless the handle 1 is pressed against an article to be welded with a force greater than the spring force of said coil spring 6, i.e., a force which is capable of withstanding the reaction from the explosion. As such, even when the trigger 2 is pulled inadvertently in an unsafe condition, closing the microswitch 4, there is no danger of causing the explosive container to explode, due to said safety switch 5 being in an off position, which is the same as in the case of the tools shown in FIG. 1 and FIG. 2. Numeral 22 is a piston having an inner protector 20 threadably engaged therein at the lower end thereof and is so provided that it is alwals urged in the downward direction by means of the spring 24 disposed in the cylindrical body 7 as described hereinbefore. Upon explosion of the container of explosive, the piston 22 slides in the cylindrical body 7, compressing the air in said cylindrical body. The compressed air, together with the action of said shock absorbing spring 24, will control and absorb the impact force of explosion. In other words, the cylindrical body 7 and piston 22 act as a pneumatic spring and the reaction of piston 22 at the time of explosion is controlled progressively by the plurality of air release holes 23 which are perforated on the side wall at the upper portion of cylindrical body 7.

In the initial stage of explosion, the piston 22 moves relatively freely with air being released through the air release holes 23, but when the top end of piston 22 passes said air release holes 23, the air in the cylindrical body 7 is completely sealed and begins to be compressed, as the top end of cylindrical body 22 moves further upward, thus building up the inner pressure of the cylindrical body. Accordingly, the greater the distance of the movement of said piston 22 becomes, the more strongly the shock from the explosion will be suppressed by air compression, together with the aid of the action of shock absorbing spring 24. Numeral 20 is an inner protector provided with a plurality of gas release holes 21, perforated on the side wall at the lower end thereof, and threadably engaged at the lower end of said piston 22. 13 and 13A are electrodes for electrically firing the explosive container 19. The electrodes hold said explosive container from both sides, and are provided with projections at the upper portion thereof. These projections are so provided that they will rest on the top of the container of explosive 19 to prevent contact of the lower end of inner protector 20 with the metal plate by keeping the lower end of the container of explosive 19 on a lower level than the lower end of the inner protector. These electrodes 13 and 13A are threadably engaged in the inner protector at two relative locations with electrode holders 11 and 11A interposed therebetween respectively and are always pressed inwardly by electrode pressing springs 25 and 25A. Numerals 26 and 26A are screws connecting said electrode pressing springs 25 and 25A with conductors 17 and 17A, which are secured at the upper portion on both sides of said inner protector 20 through insulating material. Numeral 8 is a protector secured at the lower end of cylindrical body 7 by means of threaded engagement, said protector 8 being provided with gas release holes 10 directed downwardly at its upper portion. Numerals 16 and 16A are conductors leading from the electrical firing circuit in the handle 1 and are connected with said conductors 17 and 17A at terminals 18 and 18A which are secured to the protector 8 via insulating material.

Figure 4:
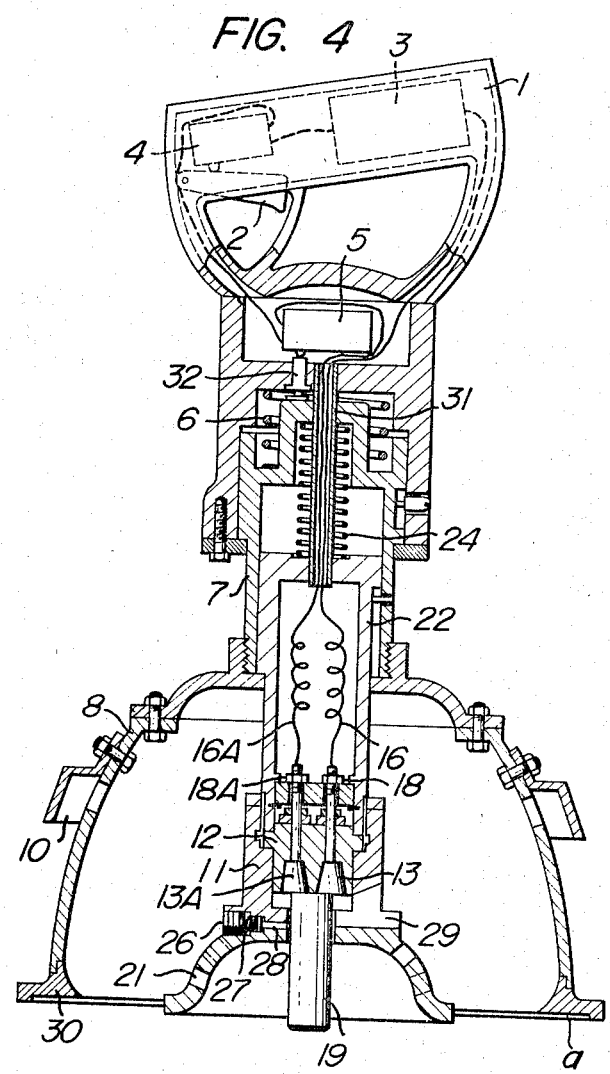

FIG. 4 is a cross-sectional view illustrating the specific structure of still another tool of the invention, wherein a cylindrical body 7 is fitted in a handle 1 with a spring 6 interposed therebetween, said spring having a spring force greater than the reaction from explosion, as in the tool shown in FIG. 3. In the inside of the cylindrical body 7, there is provided a spring 24 which exerts continuous downward pressure on a piston 22 to thereby resist the reaction from the explosion of a container of explosive. Numeral 32 is a pressing rod by means of which a microswitch 5 is pushed by the top end of the cylindrical body 7, overcoming the spring force of the spring 6, when the handle 1 is pressed with sufficient force in a direction against an article to be welded. Electrode 13 is threadably engaged at the lower end of piston 22 via an insulating member 12, and a conductor 21 which forms an electrical firing circuit, is connected with said electrode 13 through a terminal 18, after passing through the interior of cylindrical body 7 and piston 22 while being guided by a conduit 31. This is for the purpose of preventing cutting or shorting of the conductor 16 in handling the tool. An inner protector is provided with a plurality of mechanisms for holding a container of explosive at the upper portion thereof, which mechanisms comprise a pressing rod 28 having a spherical tip, a spring 27 for pressing said pressing rod and a screw 26 supporting the spring. A protector 8 is provided with a stepped ring 30, having a recess on the bottom, for the purpose of preventing occurrence of cracks in material being welded. The ring 30 is of such a configuration, that the shock wave generated from the explosion of the container of explosive 19 will be absorbed by the slight space defined by the metal plate to be welded and the recessed portion, thus controlling the direct impact of said shock wave against the contact portion a of the metal plate with the protector and consequently preventing occurrence of cracks.

In the present invention, the tool can be applied not only to a flat plate but also against a curved plate.

Namely, in the tool of the structure as shown in FIG. 1 and FIG. 2, the protector 8 is mounted on the body 7 with the spring 9 interposed therebetween. Accordingly the protector 8 is movable up and down by the action of spring 9, even in carrying out the explosive spot welding on curved plates. This will enable the workman to set a container of explosive 19 on metal plates through the tool. In case of the tool shown in FIG. 3 and FIG. 4, on the other hand, the container of explosive 19 is movable up and down by the action of the shock absorbing spring 24, through the piston 22. Hence, it is also applicable to a curved plate, as in the embodiment described above.

It is also possible, in application against a curved plate, to provide a movable contact flange 33 at the lower end of protector 8, as shown in FIG. 5, so that there may exist no space between the protector and metal plate, and to thereby prevent scattering of the fragments outside the protector.

In summary, as will be apparent from the embodiments given above, the present invention has, by providing a safe portable tool for explosive spot welding, enhanced the efficiency in the spot welding of metal plates, and has solved various problems resulting from the use of these tools, and has thereby made an explosive spot welding method using these tools really practicable.

What is claimed is:

1. A tool for explosive spot welding, comprising a handle, a body slidably mounted in said handle and adapted for supporting a container of explosive having a predetermined explosive force, a spring between said body and said handle having a spring strength greater than the force of the explosion of said container, a holder for said container secured to the lower portion of said body and having electrodes connected thereto, a protector secured to said body and surrounding the lower portion thereof as well as said holder and the container of explosive supported therefrom, and an electrical firing circuit connected to said electrodes and including activation means in said handle for the detonation of said explosive, the activation means including a switch which is actuated to close the circuit only when a force is exerted on the handle when the protector is pressed against the article to be welded to overcome the spring force of said spring.

2. A tool for explosive spot welding according to claim 1 wherein the protector has gas release holes at the upper portion thereof and is provided with a curvature around the periphery of the lower end where it contacts an article to be welded, said protector being secured to the body, a spring being interposed between said protector and body.

3. A tool for explosive spot welding, comprising a handle, a body slidably mounted in said handle and adapted for supporting a container of explosive having a predetermined explosive force, a spring between said body and said handle having a spring strength greater than the force of the explosion of said container, a holder for said container secured to the lower portion of said body and having electrodes connected thereto, protecting means comprising an inner protector having gas release holes surrounding the container of explosive and an outer protector surrounding the inner protector, and an electrical firing circuit connected to said electrodes and including activation means in the handle for the detonation of said explosive, said activation means comprising a switch which is actuated to close the circuit only when a force is exerted on the handle when one of the protectors is pressed against the article to be welded to overcome the spring force of said spring.

4. A tool for explosive spot welding according to claim 3 comprising a spring interposed between said body and said outer protector, said outer protector having gas release holes at the upper portion thereof, said outer protector having a lower peripheral edge with a curvature where it contacts an article to be welded, said inner protector being shorter than a container of explosive and being mounted from the holder such that its lower end will be spaced from the article to be welded when the lower edge of the outer protector is in contact with the article.

5. A tool for explosive spot welding according to claim 3 comprising a movable contact flange on the periphery of the lower edge of the outer protector, said flange being curved where it is to contact an article to be welded.

6. A tool for explosive spot welding according to claim 3 wherein the inner protector includes a cylindrical portion, said gas release holes being in said cylindrical portion, and a disc at the lower end of the cylindrical portion substantially closing the same.

7. A tool for explosive spot welding according to claim 3 wherein the holder comprises a mechanism for supporting a container of explosive therefrom, said mechanism comprising a pressing rod having a spherical tip adapted for contacting the container of explosive, a spring in said holder for continuously pressing said rod into contact with said container of explosive and a screw in said holder for securing said spring in the holder.

8. A tool for explosive spot welding comprising a handle; a cylindrical body slidably mounted in said handle; means supported by said body and adapted for supporting a container of explosive having a predetermined explosive force; a spring between said body and said handle having a strength greater than the force of explosion of said container; said means supported by said body comprising a piston slidably mounted in said body, shock absorbing means between said body and said piston and including a further spring between said body and piston, a holder secured to the piston at the lower end thereof and electrodes supported by said holder; protecting means for encircling the container of explosive to prevent dispersal of particles upon explosion of said container, said protecting means comprising an inner protector having gas release holes secured to said piston, and an outer protector secured to said body and surrounding the inner protector; and electrical circuit means connected to said electrodes for supplying an electrical impulse to detonate the container of explosive, said electrical circuit means comprising a safety firing circuit including switch means which is actuated to close the circuit only when the handle is pressed against the body with a force to overcome the strength of the first said spring.

9. A tool for explosive spot welding according to claim 8 wherein said outer protector has an upper portion with gas release holes therein and a lower portion having an edge with a curvature where the edge contacts an article to be welded, said inner protector being shorter than a container of explosive and being mounted from the piston such that its lower end will be spaced from the article to be welded.

10. A tool for explosive spot welding according to claim 8 wherein said cylindrical body has air release holes therein at a level such that when the piston mounted in said body is displaced therein upon detonation of said explosive, the air release holes are blocked and further displacement of the piston is resisted by a chamber of air entrapped between the body and the piston.

11. A tool for explosive spot welding according to claim 8 wherein the holder is supported from the inner protector, the holder including insulation means, the electrodes being mounted in the insulation means in the holder at opposed locations, and means resiliently urging the electrodes inwardly to contact and support the container of explosive within the inner protector.

12. A tool for explosive spot welding according to claim 8 wherein the outer protector has a lower end portion provided with an annular internal recess at the lower edge which is adapted for contacting the article to be welded to thereby provide a space between the inner periphery of the lower end portion of the outer protector and the article to be welded.

13. A tool for explosive spot welding comprising a handle, a holder adapted for supporting an explosive container, said holder and handle being supported for relative movement, spring means between said handle and holder resiliently resisting relative movement therebetween, protector means secured to said holder for surrounding said explosive container to prevent dispersal of particles upon explosion of said container, and electrical circuit means adapted for connection with the explosive container to supply an impulse thereto to detonate said container, said circuit means comprising activation means supported in said handle and switch means including first and second members respectively supported in the handle and the holder, said switch means normally being open whereby the circuit means is open and the container cannot be detonated, said switch means being closed by the contact of the members theerof upon displacement of the handle and holder relative to one another against the action of said spring means whereby subsequent actuation of the activation means will cause detonation of the explosive container.

14. A tool as claimed in claim 13 wherein said protector means comprises an inner hollow protector secured to said holder and surrounding the container of explosive, and an outer hollow protector surrounding the inner protector and also secured to the holder, said protectors each having gas release holes.

15. A tool as claimed in claim 13 wherein the container of explosive has a predetermined explosive force, said spring means having a strength greater than the explosive force of the container.

16. A tool as claimed in claim 13 wherein said holder comprises a body slidably supported in said handle, a piston slidably supported in the body and shock absorbing means between the body and piston.

17. A tool as claimed in claim 16 wherein said shock absorbing means comprises a spring between the body and the piston, said body defining a chamber with said piston, said body having air release openings providing external communication for said chamber, said piston being displaced in said body against the action of said spring upon detonation of said explosive to block the air release openings and thereby entrap air in said chamber which resists further displacement of the piston.

References Cited
UNITED STATES PATENTS

| | | | |
|---|---|---|---|
| 2,038,913 | 4/1936 | Temple | 29—421 X |
| 2,316,112 | 4/1943 | Temple | 29—421 X |
| 2,789,005 | 4/1957 | Foster | 29—421 X |
| 3,119,302 | 1/1964 | Barr. | |

JOHN F. CAMPBELL, *Primary Examiner.*

P. M. COHEN, *Assistant Examiner.*